United States Patent [19]
Oishi

[11] Patent Number: 5,870,263
[45] Date of Patent: Feb. 9, 1999

[54] MAGNETIC DISK CARTRIDGE

[75] Inventor: Kengo Oishi, Kanagawa-ken, Japan

[73] Assignees: Fuji Photo Film Co., Ltd., Tokyo, Japan; Iomega Corporation, Roy, Utah

[21] Appl. No.: 712,385

[22] Filed: Sep. 11, 1996

[51] Int. Cl.⁶ .................................................. G11B 23/03
[52] U.S. Cl. ........................................... 360/133; 369/291
[58] Field of Search ................................. 360/133, 99.02, 360/99.06, 132, 99.03, 99.07; 369/291, 75.2, 77.2, 77.1

[56] References Cited

U.S. PATENT DOCUMENTS

| | | | |
|---|---|---|---|
| 4,627,037 | 12/1986 | Tamaru et al. | 369/291 |
| 4,669,009 | 5/1987 | Naoi et al. | 360/99.02 |
| 4,686,665 | 8/1987 | Kamoshita | 369/77.2 |
| 4,749,081 | 6/1988 | Carlson et al. | 360/133 |
| 5,036,417 | 7/1991 | Aruga et al. | 360/97.01 |
| 5,570,252 | 10/1996 | Sumner et al. | 369/291 |

FOREIGN PATENT DOCUMENTS

| | | | |
|---|---|---|---|
| 61-134977 | 6/1986 | Japan | 369/291 |
| 2260289 | 10/1990 | Japan | 369/291 |

*Primary Examiner*—David L. Ometz
*Attorney, Agent, or Firm*—Sughrue, Mion, Zinn, Macpeak & Seas, PLLC

[57] ABSTRACT

A magnetic disk cartridge has a cassette shell provided on its outer surface with at least two guide grooves located symmetrically on its outer surface to extend parallel to its direction of insertion into a magnetic disk cartridge drive device. The floors of the guide grooves are formed with teeth for enabling the magnetic disk cartridge to be automatically loaded and unloaded to and from a magnetic disk cartridge drive device by meshing of the teeth with an autoloading drive gear section provided in the magnetic disk cartridge drive device. The structure improves the dimensional precision of the cassette shell and provides the magnetic disk cartridge with autoloading capability.

3 Claims, 1 Drawing Sheet

MAGNETIC DISK CARTRIDGE

BACKGROUND OF THE INVENTION

1. Field of the Invention

The present invention relates to a magnetic disk cartridge, more particularly to an improved cassette shell for a magnetic disk cartridge having a rotatable magnetic disk encased in a cassette shell.

2. Description of the Related Art

A magnetic disk cartridge comprises a magnetic disk for magnetically recording analog and/or digital signals rotatably encased in a thin cassette shell constituted of a pair of plastic cassette shell halves that are mated and joined together. The cassette shell is formed in the shape of a flat prism (substantially a hexahedron) with an approximately square top surface slightly larger than the magnetic disk, a bottom surface having an opening through which a center core supporting the center of the magnetic disk is exposed and narrow side surfaces extending between the outer peripheral edges of the top and bottom surfaces. The magnetic disk cartridge is provided with a magnetic head access opening for insertion/withdrawal of magnetic heads used for magnetic recording and reproducing so as to enable the magnetic heads to be brought into contact with, or close to, the opposite surfaces of the magnetic disk from the exterior. The magnetic head access opening is equipped with a shutter for preventing invasion of dust and the like when the magnetic disk cartridge is not in use.

Liners made of nonwoven fabric or the like are attached to the inner surfaces of the cassette shell opposite the main surfaces of the magnetic disk for protecting the surfaces of the magnetic disk from scratching as well as for wiping off dust and the like adhering thereto.

In recent years, new high-density recording methods have led to the development of a magnetic disk cartridge with 50 times the capacity of the widely used conventional magnetic disk cartridge (3.5-inch floppy disk). In order to increase the recording density and the data transfer rate of such a high-capacity magnetic disk cartridge, the magnetic disk is rotated at a much faster speed than the conventional one and the magnetic heads used for recording and reproducing signals to/from the magnetic disk are required to be positioned with very high precision. Moreover, the effective capacity of high-capacity magnetic disk cartridges can be increased by enabling multiple magnetic disk cartridges to be loaded and unloaded automatically instead of manually. Strong demand has therefore arisen for autoloading capability.

The magnetic disk cartridge of this type has a magnetic head access opening formed in one side surface of its cassette shell to a size allowing access to both surfaces of the magnetic disk from the exterior. Magnetic heads for recording and reproducing are inserted through the magnetic head access opening and brought near the rapidly rotating magnetic disk to record/reproduce signals. The cassette shell therefore has to be made to a thickness enabling insertion of the magnetic heads.

On the other hand, since the magnetic disk rapidly rotated inside the cassette shell is made of a flexible material, it has to be prevented from flopping during rotation and the space inside the cassette shell has to be precisely formed to suitable dimensions (generally to a thickness equal to that of the magnetic disk and the liners plus some amount of clearance). The required size can be achieved with high precision only if the cassette shell has sufficient rigidity, while sufficient rigidity can be obtained only if the cassette shell has sufficient thickness.

The thickness of the cassette shell therefore has to be made twice or more than that of the conventional 3.5-inch floppy disk having a thickness of about 3 mm. Accordingly, the wall thickness of the pair of cassette shell halves mated and joined to form the conventional cassette shell have also required a fairly large thickness.

However, a cassette shell with such a thick-walled structure has the drawbacks of being heavy and high in production cost owing to the large amount of material and long molding time required. Moreover, deformations known as sink marks are liable to occur in the thick-wall portions and give rise to degraded dimensional precision and poor appearance. These are quality problems that cannot be ignored.

SUMMARY OF THE INVENTION

A first object of this invention is to provide a magnetic disk cartridge having autoloading capability with respect to a magnetic disk cartridge drive device.

A second object of this invention is to provide a magnetic disk cartridge which, in addition to achieving the first object, further achieves a reduction of cassette shell weight and improved productivity and quality.

In one of its aspects the invention provides a magnetic disk cartridge whose cassette shell is provided on its outer surface with at least two guide grooves located symmetrically on its outer surface to extend parallel to its direction of insertion into a magnetic disk cartridge drive device.

In another of its aspects the invention provides a magnetic disk cartridge with autoloading capability, namely, a magnetic disk cartridge in which the floors of the aforesaid guide grooves are formed with teeth aligned in the direction of the guide grooves for enabling the magnetic disk cartridge to be automatically loaded and unloaded to and from a magnetic disk cartridge drive device by meshing of the teeth with an autoloading drive gear section provided in the drive device.

The guide grooves whose floors are formed with teeth are preferably formed to be open at the one side surface of the cassette shell formed with the magnetic head access opening and to be closed at the other end.

The guide grooves are preferably formed to splay outward in an approximately trapezoidal shape as viewed in a section taken perpendicular to the direction in which they extend.

DESCRIPTION OF THE PREFERRED EMBODIMENT

An embodiment of the magnetic disk cartridge according to the present invention will hereinbelow be described with reference to the accompanying drawings.

Figure 1:
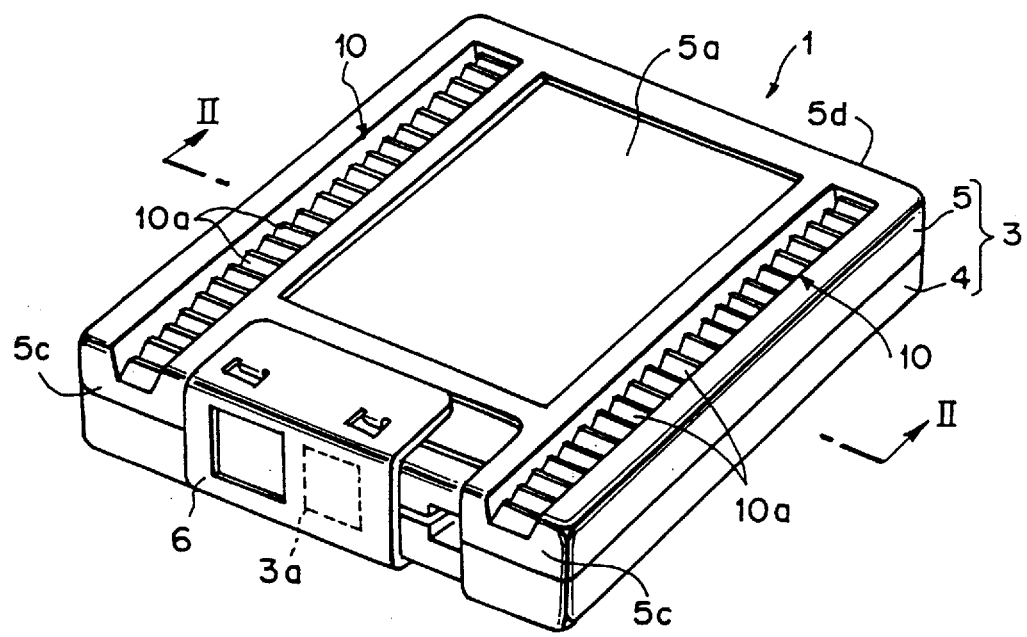
FIG. 1 is a perspective view of a magnetic disk cartridge that is an embodiment of the invention.
Figure 2:
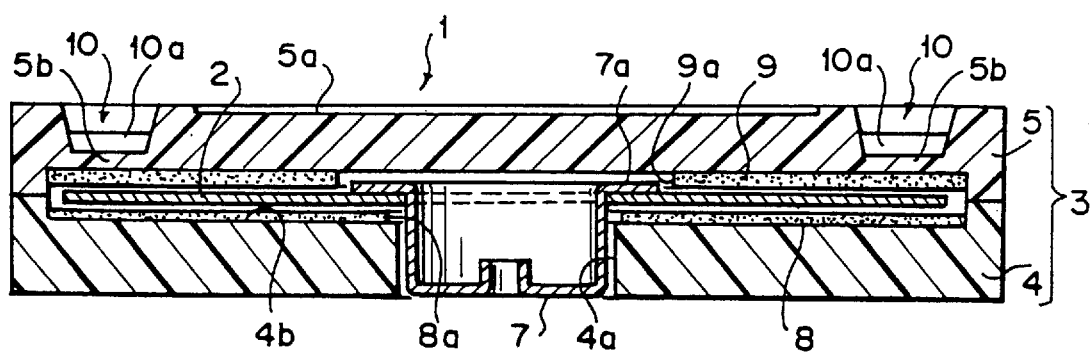
FIG. 2 is a sectional view taken along line II—II in FIG. 1.

FIGS. 1 and 2 show a magnetic disk cartridge that is an embodiment of the invention. FIG. 1 is a perspective view of the magnetic disk cartridge and FIG. 2 is a sectional view thereof taken along line II—II in FIG. 1.

The magnetic disk cartridge, designated by reference numeral 1, has a cassette shell 3 encasing a rotatable magnetic disk 2. The cassette shell 3 is formed of a pair of lower (first) and upper (second) cassette shell halves 4, 5 which are both made of molded plastic. A magnetic head access 3a opening is formed in one side surface of the cassette shell 3 for enabling magnetic reproducing and recording heads to be brought close to the opposite surfaces of the magnetic disk 2 from the exterior, and a sectionally ⌐-shaped shutter member 6 is provided to be slidable along the cassette shell for opening and closing the magnetic head access opening 3a. The shutter member 6 is biased toward the closed position by a spring (not shown). FIG. 1 shows the magnetic head access opening 3a closed by the shutter member 6 (in the closed position).

The first cassette shell half 4, located on the lower side in the figures, is formed with a circular opening 4a through which a center core 7 supporting the center of the magnetic disk 2 is exposed. A doughnut-shaped liner 8 made of nonwoven fabric and having a circular hole 8a of slightly larger diameter than the circular opening 4a is attached to the inner surface 4b of the first cassette shell half 4 by ultrasonic welding or the like. A doughnut-shaped liner 9 made of nonwoven fabric and having a circular hole 9a for avoiding interference with a flange portion 7a of the center core 7 is attached to the inner surface of the second cassette shell half 5 located on the upper side in the figures. The attachment method is similar to that of the liner 8.

The second cassette shell half 5, located on the upper side in the figures, has a labeling region 5a at the central portion of its upper surface. Two guide grooves 10, 10 are formed substantially symmetrically one on either side of the labeling region 5a to extend in the direction in which the magnetic disk cartridge 1 is inserted into a drive device (not shown). The regions of the second cassette shell half 5 under the guide grooves 10, 10 are formed as thin-wall portions 5b, 5b.

One end of each guide groove 10 opens at the one side surface 5c of the second cassette shell half 5 provided with the magnetic head access opening 3a at a portion thereof located laterally outward of the sliding region of the shutter member 6, while the other end of each guide groove 10 terminates within the upper surface of the second cassette shell half 5 and does not open at the side surface 5d on the other side of the second cassette shell half 5 from the one side surface 5c provided with the magnetic head access opening 3a.

As shown in FIG. 2, the guide grooves 10, 10 are formed to splay outward in an approximately trapezoidal shape as viewed in a section taken perpendicular to the direction in which they extend. This configuration improves the flow of resin during the molding of the second cassette shell half 5, alleviates molding distortion, improves mold release property, reduces strain imparted to the cassette shell half, and improves molding precision.

The floors of the guide grooves 10, 10 are formed with teeth 10a aligned in the longitudinal direction of the guide grooves for enabling the magnetic disk cartridge 1 to be automatically loaded and unloaded to and from a magnetic disk cartridge drive device by meshing of the teeth with an autoloading drive gear section provided in the drive device.

In the configuration according to the embodiment of the magnetic disk cartridge described in the foregoing, the provision in the guide grooves 10, 10 has the effect of reducing the wall thickness of the cassette shell 3, which in turn has the effect of enhancing its dimensional precision, while the provision in the guide grooves 10, 10 of the teeth 10a for meshing with the autoloading drive gear section of the magnetic disk cartridge drive device produces the additional effect of imparting the magnetic disk cartridge with autoloading capability with respect to a magnetic disk cartridge drive device.

The formation of the guide grooves 10, 10 to open only at the one side surface 5c of the second cassette shell half 5 provided with the magnetic head access opening 3a and to be closed at their opposite ends enables the magnetic disk cartridge 1 to be loaded in the magnetic disk cartridge drive device only when it is oriented with its magnetic head access opening 3a directed toward the drive device and makes it impossible to load it in the opposite direction. This precludes improper loading.

The guide grooves 10, 10 can instead be provided in the first (lower) cassette shell half 4 rather than the second (upper) cassette shell half 5 or be provided in both cassette shell halves 4 and 5.

The magnetic disk cartridge according to invention can be endowed with autoloading capability by providing the guide grooves with the teeth for meshing with the autoloading drive gear section of a magnetic disk cartridge drive device.

By forming the guide grooves to open only at the one side surface of the cassette shell provided with the magnetic head access opening and to be closed at their opposite ends, the magnetic disk cartridge can be made loadable into the magnetic disk cartridge drive device only when it is oriented with the magnetic head access opening directed toward the drive device and be made impossible to load in the opposite direction. Maloperation can therefore be prevented at the time of recording/reproducing signals to/from the magnetic disk cartridge.

Moreover, since the provision of the two or more guide grooves in the outer surface of the cassette shell reduces the wall thickness of the cassette shell at these portions, it reduces the weight of the cassette shell and improves its productivity owing to the shorter molding time required. It also enhances the dimensional precision of the cassette shell interior and improves the appearance of the cassette shell.

By forming the guide grooves to splay outward in an approximately trapezoidal shape as viewed in a section taken perpendicular to the direction in which they extend, the flow of resin during the molding of the second cassette shell half can be improved.

What is claimed is:

1. A magnetic disk cartridge comprising:

a magnetic disk, a center core supporting the center of the magnetic disk, and a cassette shell encasing the magnetic disk to be rotatable in a plane therein and said cassette shell being formed in one side surface with a magnetic head access opening, the cassette shell including a first cassette shell half formed with an open portion through which the center core is exposed and a second cassette shell half mating with the first cassette shell half, wherein the cassette shell is provided on an outer surface thereof lying in a plane parallel to the rotatable plane of the magnetic disk, with at least two guide grooves located symmetrically on either side of said outer surface, said guide grooves extending parallel in an extension direction which corresponds to a direction of insertion into a magnetic disk cartridge drive devices;

wherein floors of the guide grooves are formed with teeth aligned in the extension direction of the guide grooves for enabling the magnetic disk cartridge to be automatically loaded and unloaded to and from the magnetic disk cartridge drive device by meshing of the teeth with an autoloading drive gear section provided in the drive device.

2. A magnetic disk cartridge as defined in claim 1, wherein the guide grooves disposed on said outer surface of the cassette shell lying parallel to the magnetic disk, are formed to be open at one end at a side surface of the cassette shell formed with the magnetic head access opening and to be closed at an other end.

3. A magnetic disk cartridge according to claims 1 or 2, wherein the guide grooves are formed to splay outward in an approximately trapezoidal shape as viewed in a section taken perpendicular to the direction in which they extend.

* * * * *